(No Model.)

J. A. McGINNIS.
BICYCLE SUPPORT.

No. 513,243.  Patented Jan. 23, 1894.

WITNESSES
Warren W. Swartz
H. M. Corwin

INVENTOR
John A. McGinnis
by W. Bakewell & Sons
his Attorneys

UNITED STATES PATENT OFFICE.

JOHN A. McGINNIS, OF WHEELING, WEST VIRGINIA.

BICYCLE-SUPPORT.

SPECIFICATION forming part of Letters Patent No. 513,243, dated January 23, 1894.

Application filed November 9, 1892. Renewed December 7, 1893. Serial No. 492,989. (No model.)

*To all whom it may concern:*

Be it known that I, JOHN A. MCGINNIS, of Wheeling, in the county of Ohio and State of West Virginia, have invented a new and useful Improvement in Bicycle-Supports, of which the following is a full, clear, and exact description, reference being had to the accompanying drawings, forming part of this specification, in which—

Figure 1:
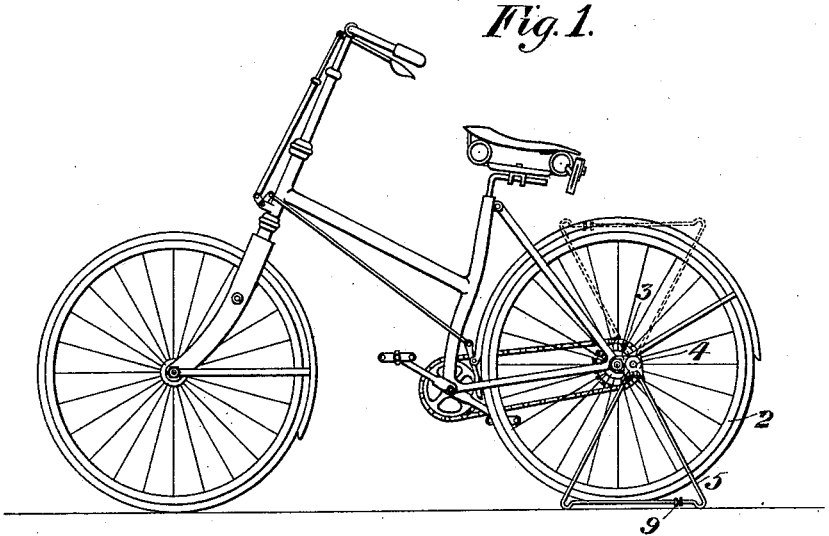
Figure 3:
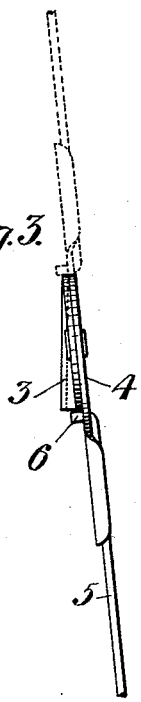
Figure 2:
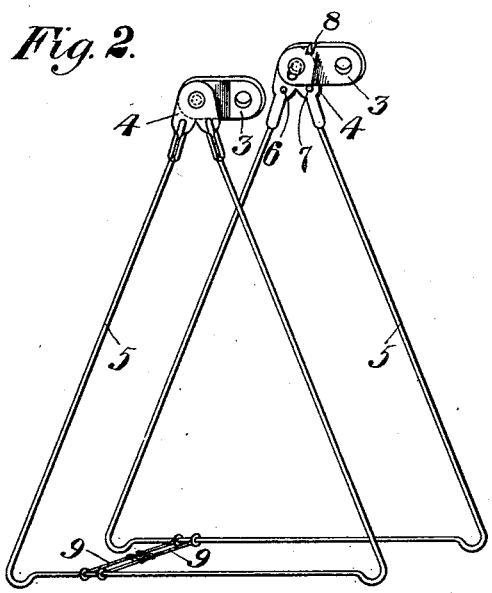

Figure 1 is a side elevation of a bicycle provided with my improved support or stand; and Fig. 2 is a perspective view of the support detached. Fig. 3 is an enlarged detail view.

My invention relates to the stands employed for bicycles, and is designed to simplify and improve that class of stands or supports which are carried upon the bicycle itself.

To that end it consists in two plates rigidly secured to the ends of the rear axle, and a swinging frame pivoted to each plate, these frames being preferably connected.

It also consists in means for causing the lower ends of the frames, which are parallel in their upper inoperative position, to diverge as they are swung to their lower working position, thus giving the support a broad base, as well as in the construction and arrangement of the parts as hereinafter more fully described and set forth in the claims.

In the drawings, 2 indicates the rear wheel of a bicycle, having rigidly bolted to the opposite ends of its axle the plates 3, 3. To these plates are pivoted, by means of the Λ-shaped plates 4, 4, the skeleton frames 5, 5, consisting of a wire bent into triangular form, the ends of the wires passing through the plates 4, 4, and forming projecting lugs 6, 7, on the inside, while the lower portions of the plate-arms are bent around the wires to hold the same firmly in place. The forward ends of the plates 3, 3, are bent inwardly so as to be parallel to each other, the rear portions to which the plates 4, 4, are pivoted being inclined or beveled outwardly, so that as the rest or support is swung downwardly into operative position, the plates 4, 4, riding on the incline, push out the lower ends of the frame, while, when it is swung upwardly, the upper ends of the Λ shaped plates force the frames into parallelism. The forward lug 7, striking against the lower edge of the plate 3, holds the rest in its lower position, and when swung over the wheel by pushing downwardly thereon, the lug 6 drops into the slot 8 in the plate 3 and locks the rest in position, the plate 3 being slotted for the reception of the pivot of the plate 4.

The lower portions of the frames are guided and limited in their movements by the interlocking wires 9, 9, which are looped about each other and secured at their ends to the frames.

The action of the device is obvious. When not in use, it is swung up into the position shown in dotted lines in Fig. 1, the frames being drawn into parallelism and locked by pushing the lug 6 into the slot of plate 3. When in use, it is swung downwardly, the lower portions of the frames thereby being forced apart and held by the guides 9, 9, and the lug 7 striking against the plate 3.

The advantages of the device are apparent. By placing it upon the rear wheel it is entirely out of the way, is hardly noticeable and not in the sight of the rider. The parts are simple and few in number, and a wide base is obtained, while it occupies small space when raised.

Many variations in the form and arrangement of the parts may be made without departure from my invention, since

What I claim is—

1. A bicycle-rest consisting of frames having divergent side portions and a horizontal connecting foot, said frames being pivoted on opposite sides of the wheel, and being adapted to be swung on the pivots in planes lengthwise of the bicycle; substantially as described.

2. A bicycle-rest consisting of frames having divergent side-portions, said frames being pivoted on opposite sides of the wheel, and being adapted to be swung on the pivots in planes lengthwise of the bicycle; substantially as described.

3. A bicycle support comprising two frames pivoted to the rear wheel, and a sliding connection between the same, substantially as and for the purposes described.

In testimony whereof I have hereunto set my hand this 4th day of November, A. D. 1892.

JOHN A. McGINNIS.

Witnesses:
GEO. W. BORING,
C. W. McGINNIS.